(12) United States Patent
Luft et al.

(10) Patent No.: US 6,395,855 B1
(45) Date of Patent: May 28, 2002

(54) QUICK-HARDENING SILICONE MATERIALS WITH GOOD ADHESIVE PROPERTIES

(75) Inventors: Werner Luft, Reitmehring; Michael Futscher, Chieming; Hermann Pahl, Stein an der Traun, all of (DE)

(73) Assignee: Heidelberger Bauchemie GmbH, Heidelberg (DE)

( * ) Notice: Subject to any disclaimer, the term of this patent is extended or adjusted under 35 U.S.C. 154(b) by 0 days.

(21) Appl. No.: 09/623,314

(22) PCT Filed: Jul. 8, 1999

(86) PCT No.: PCT/EP99/04801

§ 371 (c)(1),
(2), (4) Date: Aug. 31, 2000

(87) PCT Pub. No.: WO00/05309

PCT Pub. Date: Feb. 3, 2000

(30) Foreign Application Priority Data

Jul. 21, 1998 (DE) .......................................... 198 32 688

(51) Int. Cl.[7] .............................................. C08G 77/08
(52) U.S. Cl. ............................ 528/14; 528/34; 528/23; 528/15; 528/16; 524/863; 524/864
(58) Field of Search .............................. 528/14, 15, 16, 528/23, 34; 524/588, 863, 864

(56) References Cited

U.S. PATENT DOCUMENTS

| | | | |
|---|---|---|---|
| 4,075,154 A | * | 2/1978 | Itoh et al. ............... 260/37 SB |
| 4,508,888 A | | 4/1985 | Michel et al. |
| 5,739,248 A | | 4/1998 | Hoheneder ................... 528/38 |

FOREIGN PATENT DOCUMENTS

| | | |
|---|---|---|
| DE | 44 31 489 | 3/1996 |
| EP | 0 548847 | 6/1993 |
| EP | 0 644231 | 3/1995 |

OTHER PUBLICATIONS

Patent Abstracts of Japan, vol. 016, No. 310 (C–0960), Jul. 8, 1992.

* cited by examiner

*Primary Examiner*—Margaret G. Moore
(74) *Attorney, Agent, or Firm*—Foley & Lardner

(57) ABSTRACT

The present invention relates to mixtures containing bi-functionally terminated diorganopoly siloxanes aminosilane or oxime or alkoxy crosslinking agents, and optionally, filling materials, suitable additives, pigments, colorants, anti-oxidation pigments, anti-heat pigments, and light-protection pigments in addition to solvents and plasticizers. Said mixtures contain water and a catalyst in the form of an acidic or basic neutral salt as an accelerating cross-linking agent.

24 Claims, No Drawings

QUICK-HARDENING SILICONE MATERIALS WITH GOOD ADHESIVE PROPERTIES

The present invention concerns a kit for the production of mixtures of at least bifunctionally terminated diorganopolysiloxanes, amino silane cross-linking agents, as well as possibly filling materials, suitable additives, pigments, colouring materials, oxidation- heat- and light-protesting pigments, as well as solvents and plasticisers.

Such organopolysiloxane mixtures, also known as cold-vulcanising, monocomponent silicone rubbers, usually cross-link at room temperature with take up of water from the surrounding atmosphere to give rubber elastic polymers. As chain lengtheners and cross-linkers, there are used bi- and preferably higher functional aminosilane compounds which, by reaction with the polysiloxane or by hydrolysis, split off amines and thus initiate the formation of a macromolecular meshwork. After hardening has taken place, such masses are characterised by a good inherent adhesion to the most varied material surfaces and by a Generally high stability towards the action of temperature, light, moisture, as well as chemicals.

The hardening of such monocomponent polysiloxane mixtures cross-linking at room temperature with the take up of moisture takes place comparatively slowly since the water necessary for the reaction must diffuse from the surrounding atmosphere into the interior of the mass, Therefore, the speed of the hardening through decreases with progressive reaction in the interior of the mass. In the case of low atmospheric moisture or in the case of an unfavourable ratio of surface to volume of the silicone mass, the reaction can be very slow or, in the case of vapour-tight closed spaces, come to a complete stop.

The per se multiple possibilities of use of such atmospheric moisture-hardening silicones as sealing or adhesive material are, especially in the case of use in industrial fabrication, limited because of the slow hardening. Admittedly, silicone rubber systems hardening quickly at room temperature or also first at elevated temperature are known but their use fails frequently by the deficient inherent adhesion or also the comparatively low temperature stability of these products. However, if one uses silicones hardening only slowly under the influence of atmospheric moisture, in the case of short cycle times desired for economic reasons large intermediate storage for sealed off or adhered parts are necessary in order to ensure the hardening. This intermediate storage must possibly be additionally climatised or moistened. Under certain circumstances, in this way already large numbers of pieces are produced before a testing for fault-freedom and function of the produced goods is first possible. Large-surface adhesions between diffusion-tight surfaces can, in practice, be carried out just as little with atmospheric moisture-hardening silicones as the production of formed bodies in closed moulds.

If one adds water in liquid form to the known aminosilane-containing and atmospheric moisture-hardening masses, in comparison to the cross-linking with atmospheric moisture, a certain acceleration of the hardening is achieved. However, this form of the cross-linking does not lead to end products with material properties such as are obtained in the case of purely atmospheric moisture cross-linking. On the contrary, masses result which over time remain substantially softer, display poor inherent adhesion and remain still a very long time swollen with the amine resulting as cross-linking fission product. Correspondingly, the amine smell, usually found to be extremely unpleasant, also persists for a long time.

From DE 4431489 it is known that aminosilane-cross-linking silicone masses harden rapidly when one adds to the system a paste which contains water and an inorganic or organic compound which reacts with the amines with salt formation. Inorganic and organic acids come into consideration as such compounds. The addition of these accelerating substances takes place immediately before the working up of the mass. The acid reacts with the fission product, the amine, with salt formation, whereby the reaction equilibrium is displaced to the side of the product. The salt formed remains in the polymer matrix and thus has a considerable influence of the material end properties of the hardened polymer. Especially-affected thereby is the temperature stability which is limited by the salt of the amine remaining in the matrix. The basis therefor is the possibility of the acidolytic or aminolytic cleavage of the polydimethylsiloxane structure at elevated temperatures. Thus, for example, already after some days continuous stressing at 250° C., an embrittlement is observed of a silicone mass accelerately hardened by addition of oxalic acid dihydrate. Furthermore, by reaction of the oxalic acid with chalk at elevated temperatures, a gaseous decomposition takes place.

Thus, the task forming the basis of the invention is to make available a building kit for the production of sealing and adhesive masses based on aminosilane-cross-linking polysiloxane mixtures, whereby these are to harden within a short time, i.e. within a few minutes up to several hours and independently of the surrounding atmospheric moisture, whereby, besides the typical characteristics of the previously known vulcanisates, such as, for example, inherent adhesion, mechanical properties and stability, especially the temperature stability of the accelerately hardened silicone is to be improved.

It has now been found that the replacement of inorganic or organic acids of the known constructional kits acting as accelerator components by acidic or basic neutral salts in the case of an accelerating action on the hardening comparable with acids, provides a clearly improved-temperature stability of the silicones polymerised under these conditions. By acidic or basic neutral salts are understood compounds in which calculatedly all ionisable hydrogen atoms of the acid are replaced by other cations and all OH groups of the cation base by acid anions and, solely via the differing degree of dissociation of the underlying acids and bases,the aqueous solutions of the salts react acidic or basic, especially in the case of 1 molar solutions pH values of below 5 or above 9, especially below 4 or above 10 are obtained. Furthermore, it was found that, besides aminosilane, also oxime and alkoxy cross-linkers can be advantageously used as components.

The task forming the basis of the invention is solved by the features of the main claim and promoted by those of the subsidiary claims. Such constructional kits for the production of the mixtures are characterised in that they contain at least the following components:

A) 100 wt. parts of an at least bifunctionally terminated diorganopolysiloxane, whereby this is built up from a linear or branched chain of repeating units of the formula

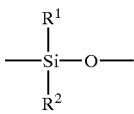

and—as shown in the following in the case of a linear chain—is terminated with functional end groups Z.

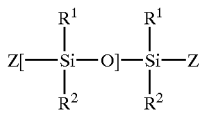

There hereby mean:
$R^1$, $R^2$: saturated or unsaturated hydrocarbon radicals with 1–15 carbon atoms, possibly substituted with halogen or cyano groups
Z: —H, —OH, —$OR^1$, —$OSiR^3(NR^4R^5)_2$, —C—Si—$(ON=CR^4R^5)_3$ and —C—Si—$(OR^3)_3$
$R^3$: hydrogen or monovalent saturated or unsaturated hydrocarbon or hydrocarbonoxy radical with 1–15 carbon atoms.
$R^4$, $R^5$: hydrogen and/or saturated or unsaturated aliphatic, cycloaliphatic or aromatic hydro-carbon radical with 1 to 15 carbon atoms, possibly substituted with halogen or cyano groups
B) 0.1 to 20 wt. parts of an aminosilane or oxime or alkoxy cross-linker of the general formulae

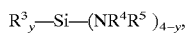

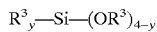

C) 0.1 to 20 wt. parts of a catalyst in the form of an acidic or basic neutral salt
D) 0 to 20 wt. parts water.

As example for the radicals $R^1$ and $R^2$ of the components A are to be named any desired saturated alkyl radicals, such as methyl, ethyl, n-propyl, isopropyl, octyl, dodecyl, octadecyl, but also cyclic, such as cyclopentyl and cyclobexyl. Furthermore, there can be used unsaturated aliphatic and cyclo-aliphatic radicals, such as vinyl, allyl, cyclo-pentenyl or cyclohexenyl and also aromatic, such as phenyl or naphthyl, and aliphatic substituted radicals, such as for example benzyl or toluyl. Within a poly-siloxane, the radicals $R^1$ and $R^2$ can be of the same or also different construction. It is also possible to mix branched and unbranched polysiloxanes with the above-described construction and in different chain length. Preferably, there are used polysiloxanes terminated with hydroxyl groups, so-called α, ω-dihydroxydiorganopolysiloxanes with methyl and phenyl radicals.

The said radicals can also be used in halogen- or cyano-substituted form. Examples herefor are 1,1,1-trifluorotoluyl, β-cyancethyl or o-, m- or p-chlorophenyl radicals.

The viscosity of the diorganopolysiloxanes preferably lies in the range of 500 to 350000 mPas.

The radical $R^3$ can, besides hydrogen, be of the same construction as the radicals $R^1$ and $R^2$. There are preferably used simple alkyl radicals, such as methyl or ethyl.

The radicals $R^4$ and $R^5$ can be of the same construction as the radicals $R^1$, $R^2$ or $R^3$, whereby one of the two radicals can also be hydrogen. Organoamino-silanes are preferably used which are obtained, for example from reactions of methyltrichlorosilanes with primary, aliphatic or cycloaliphatic amines, especially with sec-butylamine or cyclohexylamine.

As component C are suitable acidic and basic neutral salts, such as for example the acidic neutral salts of aluminium, especially the sulphate, the chloride and the nitrate, the aluminium alums of the ammonium ion and of the alkali metals, preferably of sodium and potassium. Furthermore, as advantageous representatives of the acidic neutral salts, there are to be mentioned the salts of iron, thereby especially iron II sulphate, iron III phosphate, iron alum of the ammonium ion, as well as ammonium iron II sulphate (Mohr's salt). Acceleratingly-acting basic neutral salts are, for example, trisodium phosphate and sodium metasilicate. The acidic or basic neutral salts can possibly also be used in combination.

Component D can be added to the mixture not only in liquid form but also bound as water of crystallisation, for example as sodium sulphate decahydrate, or enclosed in zeolites or also adsorbed on the surface of filling materials, such as for example calcium carbonate. The addition of component D preferably takes place in combination with component C bound as water of crystallisation.

To the mixtures of the components A to D can be added further materials for the achievement of special properties. To be mentioned here are especially coloured pigments and soluble coloured materials, stabilisers against oxidation and the action of beat, dispersants, reaction catalysts, fungicides, adhesives, solvents, flame protection acents, plasticisers (preferably silicone oil-but also based on hydrocarbons), strengthening filling materials, such a for example highly dispersed or precipitated silicic acids, granhite, carbon black, as well as passive filling materials, such as e.g. calcium carbonate, silicates, quartz meal, glass and carbon fibres, diatomaceous earth, metal powder, metal oxides, synthetic material powder, as well as hollow spheres of glass or synthetic material. As silicic acids, there are preferably used pyrogenic silicic acids, the polar surface of which is hydrophobed.

Mixtures of the components A to D are not storage-stable. Therefore, the components C and D necessary for the reaction acceleration are admixed with the mixture of the components A and B immediately before use in a suitable mould, preferably pasted in silicone oils or polymers of the component A.

The present invention also concerns processes for the production of a sealing or adhesive mixture or moulding mass based on at least bifunctionally terminated diorganopolysiloxanes and cross-linkers which are characterised in that
A) 100 wt. parts of such a diorganopolysiloxane, whereby this is built up of a linear or branched chain of repeating units of the formula

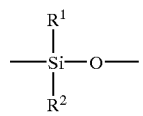

and, corresponding to the following on the special case of linear chains according to the formula

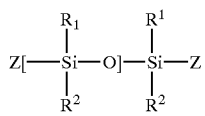

is terminated with functional end groups Z, and whereby
$R^1$, $R^2$: are saturated or unsaturated hydrocarbon radicals with 1–15 carbon atoms, possibly substituted with halogen or cyano groups Z: —H, —OH, —OR$^1$, —OSiR$^3$(NR$^4$R$^5$)$_2$, —O—Si—(ON=CR$^4$R$^5$)$_3$ and —O—Si—(OR$^3$)$_3$ R$^3$: hydrogen or monovalent saturated or unsaturated hydrocarbon or hydrocarbonoxy radical R$^4$,R$^5$: hydrogen and/or saturated or unsaturated aliphatic, cycloaliphatic or aromatic hydro-carbon radical with 1 to 15 carbon atoms, possibly substituted with halogen or cyano groups B) 0.1 to 20 wt. parts of an aminosilane or oxime or alkoxy cross-linker of the general formulae

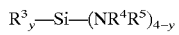

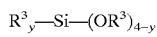

whereby Y=0 or 1 and R$^3$, R$^4$ and R$^5$ have the above meaning, as well as possibly coloured pigments or soluble coloured materials, stabilisers against oxidation and the action of heat, dispersers, reaction catalysts, fungicides, adhesives, solvents, flame-protection agents, plasticisers (preferably silicone oils but also plasticizers based on hydrocarbons), furthermore, active, strengthening filling materials, such as for example highly dispersed or precipitated silicic acids, graphite, carbon black, as well as passive filling materials, such as e.g. calcium carbonate, silicates, quartz meal, glass and carbon fibres, diatomaceous earth, metal powder, metal oxides, synthetic material powder, as well as hollow spheres of glass or synthetic material, are mixed with one another and immediately before use are added C) 0.1 to 20 wt. parts of a catalyst in the form of and acidic or basic neutral salt, D) 0 to 20 wt. parts water, possibly pasted in silicone oils or polymers.

The mixtures prepared with the help of the constructional kit according to the invention preferably harden at room temperature in 20 minutes to 3 hours to give a solid, adhesion-free and cutable mass. Increased temperature in the case of the hardening (about 40° C.) brings about an additional accelerating effect. The silicone mixtures adhere themselves to substrates of glass, ceramic, wood, concrete, plaster, metals and synthetic materials. A rapidly built up inherent adhesion is achieved especially on glass, metals and synthetic materials with polar surface. Therefore, the mixtures according to the invention are advantageously used as adhesive or sealing materials, as protective coverings for electrical insulation, as casting masses for electrical and electronic constructional parts but also as moulding masses for the production of impressions or other moulded parts which are usefully produced from elastomers.

In the following, the invention is explained in more detail on the basis of an Example.

EXAMPLE 100 wt. parts of a component I consisting of:

100 wt. parts of an α,ω-dihydroxydimethylpoly-siloxane with a viscosity of 20,000 mPa·s, 18 wt. parts of a highly dispersed silicic acid with a specific surface area according to BET of about 110 m$^2$/g 15 wt. parts of a calcium carbonate filling material, 8 wt. parts tris-(cyclohexylamino)-methylsilane are homogeneously mixed together with 25 wt. parts of a component II consisting of:

100 wt. parts of an α,ω-dihydroxydimethylpolysiloxane with a viscosity of 20000 mPa·s, 9 wt. parts of a highly dispersed silicic acid with a specific surface area according to BET of about 150 m$^2$/g, 2.5–3 wt. parts of an ammonium aluminium alum dodecahydrate of <100 μm.

The silicone mixture produced from the components of a constructional kit according to the invention was hardened or mutable after about 25 min at room temperature with exclusion of atmospheric moisture and, after one hour, achieved a Shore hardness of about 20–25. The end hardness, measured after 7 days, amounts to Shore A of about 40. Under these conditions, both components remain storage-stable pastes. The mass shows an astonishing temperature stability under temperature conditions of up to 250° C. The weight loss in the case of a temperature stressing of 250° C. amounts, after one day, to about 5%, caused by emerging cleavage product, after 7 days to 8%. and, after 42 days, lies at about 12%.

Furthermore, a rapidly built up inherent adhesion on various substrates, especially glass, metals and synthetic materials with polar surface, was achieved. The initial adhesion on these substrates is thereby so strong already after 30 min that a pulling off of the mass from the adhesion surface is only possible with mechanical destruction. Adhered parts can already be mechanically stressed after 30 minutes.

In the following Table, there are given further experiments with other acidic or basic neutral salts, whereby the components I and II, as well as the production, was carried out according to the above Example. The amount of water introduced via the accelerator substance C thereby amount to about 0.3 g/100 g of I component, which suffices wholly or preponderantly to hydrolyse the added cross-linker (B component). A separate addition of water (component D) is not necessary.

| accelerator | water of crystallisation | pH value | mixing ratio I:II (wt.parts) | hardened/cutable |
|---|---|---|---|---|
| acidic neutral salts: | | | | |
| Al$_2$(SC$_4$)$_3$ | 18 | 3–4 | 100:25 | >3 h |
| NH$_4$Fe(SO$_4$)$_2$ | 12 | 1 | 100:25 | ~60 min |
| FePO$_4$ | 4 | | 100:25 | ~75 min |
| FeSO$_4$ | 7 | 3–4 | 100:25 | ~70 min |
| NH$_4$Al(SO$_4$)$_2$ | 12 | 3–4.5 | 100:25 | ~25 min |
| AlCl$_3$ | 6 | 2.5–3.5 | 100:25 | ~3 h |
| KAl(SO$_4$)$_2$ | 12 | 3–3.5 | 100:25 | ~60 min |
| basic neutral salts: | | | | |
| Na$_4$P$_2$O$_7$ | 10 | 8.8–9.4 | 100:25 | ~40 min |
| Na$_3$PO$_4$ | 10 | 12 | 100:25 | ~50 min |
| Na$_2$SiO$_3$ | 5 | 12.5 | 100:25 | >3 h |
| water addition (comparison) | | | | |
| H$_2$O (Liquid) | | | | ~2 d |
| SiO$_2$ + x H$_2$O | | | | >>8 h |

By the use of the acidic or basic neutral salts, systems based on oxime or alkoxy cross-linker can also be accelerated.

What is claimed is:

1. Constructional kit for the production of rapidly hardening, silicone masses of at least bifunctiorially terminated diorganopolysiloxanes, cross-linkers, as well as optional filling materials, additives and pigments, comprising the following components:

A) 100 wt. parts of an at least bifunctionally terminated diorganopolysiloxane, whereby this polysiloxane is built up from a linear or branched chain of repeating units of the formula

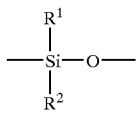

and contains at least two end groups Z with
Z is one or more of: —H, —OH, —OR$^1$, —OSiR$^3$ (NR$^4$R$^5$)$_2$ —O—Si—(ON=CR$^4$R$^5$)$_3$ or —O—Si—(OR$^3$)$_3$
R$^1$, R$^2$: saturated or unsaturated hydrocarbon radicals with 1 to 15 carbon atoms optionally substituted with halogen or cyano groups,
B) 0.1 to 20 wt. parts of a cross-linker,
C) 0.1 to 20 wt. parts of an accelerator,
D) 0 to 20 wt. parts water,
characterised in that the accelerator in component C is an acidic or basic neutral salt and the component B an aminosilane cross-linker of the general formula:

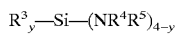

whereby y=0 or 1,
with R$^3$: hydrogen or monovalent saturated or unsaturated hydrocarbon or hydrocarbonoxy radical and
R$^4$, R$^5$ are independently one or more of: hydrogen or saturated or unsaturated aliphatic, cycloaliphatic or aromatic hydrocarbon radical with 1 to 15 carbon atoms, optionally substituted with halogen or cyano groups; or an oxime or alkoxy cross-linker of the general formula:

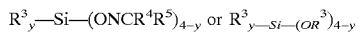

whereby y=0 or 1 and R$^3$, R$^4$ and R$^5$ have the above meaning.

2. Constructional kit according to claim 1, wherein the accelerator component C is contained in water of crystallisation-containing form.

3. Constructional kit according to claim 2, wherein as component D, water of crystallisation-hydrate materials or water absorbed on zeolites or silica gels or adsorbed in filling material surfaces is used.

4. Constructional kit according to claim 2, wherein there are additionally contained one or more of coloured pigments or soluble colouring materials, stabilisers against oxidation and action of heat, dispersers, reaction catalysts, fungicides, adhesives, solvents, flame-protection agents, plasticisers, active, strengthening filling materials, or passive filling materials.

5. Constructional kit according to claim 4, wherein the plasticisers comprise one or more of silicone oils and plasticisers based on hydrocarbons; the active, strengthening filling materials comprise one or more of highly dispersed or precipitated silicic acids, graphite or carbon black; and the passive filling materials comprise one or more of calcium carbonate, silicates, quartz meal, glass or carbon fibres, diatomaceous earth, metal powder, metal oxides, synthetic material powder, or hollow spheres of glass or synthetic materials.

6. Constructional kit according to claim 2, wherein as diorganopolysiloxane component A, there is used an α,ω-dihydroxydiorganopolysiloxane.

7. Constructional kit according to claim 1, wherein as component D, water of crystallisation-hydrate materials or water absorbed on zeolites or silica gels or adsorbed in filling material surfaces is used.

8. Constructional kit according to claim 7, wherein as diorganopolysiloxane component A, there is used an α,ω-dihydroxydiorganopolysiloxane.

9. Constructional kit according to claim 7, wherein there are additionally contained one or more of coloured pigments or soluble colouring materials, stabilisers against oxidation and action of heat, dispersers, reaction catalysts, fungicides, adhesives, solvents, flame-protection agents, plasticisers, active, strengthening filling materials, or passive filling materials.

10. Constructional kit according to claim 9, wherein the plasticisers comprise one or more of silicone oils or plasticisers based on hydrocarbons; the active, strengthening filling materials comprise one or more of highly dispersed or precipitated silicic acids, graphite or carbon black; and the passive filling materials comprise one or more of calcium carbonate, silicates, quartz meal, glass and carbon fibres, diatomaceous earth, metal powder, metal oxides, synthetic material powder, or hollow spheres of glass or synthetic materials.

11. Constructional kit according to claim 1, further comprising one or more of coloured pigments or soluble colouring materials, stabilisers against oxidation and action of heat, dispersers, reaction catalysts, fungicides, adhesives, solvents, flame-protection agents, plasticisers, active, strengthening filling materials, or passive filling materials, in the components A–D.

12. Constructional kit according to claim 11, wherein the plasticisers comprise one or more of silicone oils or plasticisers based on hydrocarbons; the active, strengthening filling materials comprise one or more of highly dispersed or precipitated silicic acids, graphite or carbon black; and the passive filling materials comprise one or more of calcium carbonate, silicates, quartz meal, glass or carbon fibres, diatomaceaous earth, metal powder, metal oxides, synthetic material powder, or hollow spheres of glass or synthetic materials.

13. Constructional kit according to claim 11, wherein as diorganopolysiloxane component A, there is used an α,ω-dihydroxydiorganopolysiloxane.

14. Constructional kit according to claim 1, wherein as diorganopolysiloxane component A, there is used an α,ω-dihydroxydiorganopolysiloxane.

15. Process for the production of a sealing or adhesive mixture based on diorganopolysiloxanes and aminosilane or oxime or alkoxy cross-linkers, wherein components A and B according to claim 1 are mixed to give a first pre-mixture and the components C and D according to claim 1 to give a second pre-mixture and, shortly before use, the two pre-mixtures are combined to give the effective sealing and adhesive mixture.

16. Process according to claim 15, wherein component C comprises a compound which is contained in water of crystallisation-containing form and component D comprises water of crystallisation-hydrate materials, water absorbed on zeolites or silica gels or adsorbed in filling material surfaces.

17. Process according to claim 16, wherein the components C and/or D, optionally in combination with materials selected from the group consisting of coloured pigments or soluble colouring materials, stabilisers against oxidation and action of heat, dispersers, reaction catalysts, fungicides, adhesives, solvents, flame-protection agents, active, strengthening filling materials, and passive filling materials, are pasted and a plasticiser is optionally added, which is based on silicone or the diorganopolysiloxane polymer.

18. Process according to claim 16, wherein the diorganopolysiloxane A is an α,ω-dihydroxydiorganopolysiloxane.

19. Process according to claim 15, wherein the components C and/or D, optionally in combination with materials comprising one or more of coloured pigments or soluble colouring materials, stabilisers against oxidation and action of heat, dispersers, reaction catalysts, fungicides, adhesives, solvents, flame-protection agents, active, strengthening filling materials, or passive filling materials, are pasted, and a plasticiser is optionally added, which is based on silicone or the diorganopolysiloxane polymer.

20. Process according to claim 19, wherein the diorganopolysiloxane A is an α,ω-dihydroxydiorganopolysiloxane.

21. Process according to claim 19, wherein the plasticisers comprise one or more of silicone oils or plasticisers based on hydrocarbons; the active, strengthening filling materials comprise one or more of highly dispersed or precipitated silicic acids, graphite or carbon black; and the passive filling materials comprise one or more of calcium carbonate, silicates, quartz meal, glass or carbon fibres, diatomaceous earth, metal powder, metal oxides, synthetic material powder, or hollow spheres of glass or synthetic materials.

22. Process according to claim 15, wherein the diorganopolysiloxane component A is an α,ω-dihydroxydiorganopolysiloxane.

23. Process for sealing or bonding, comprising applying mixtures of the constructional kits according to claim 1 to a surface to be sealed or bonded.

24. Process for producing a molded mass, comprising molding mixtures of the constructional kits according to claim 1 into a desired shape.

* * * * *